United States Patent [19]

Pemberton et al.

[11] Patent Number: 5,330,306
[45] Date of Patent: Jul. 19, 1994

[54] PALLET HANDLING PLATTEN UNIT

[75] Inventors: Trevor A. Pemberton, Sutton Bassett; John C. A. Wright, Dunstable; David M. Jinks, Gaddesby, all of United Kingdom

[73] Assignee: Cleco Limited, Leicestershire, United Kingdom

[21] Appl. No.: 871,492

[22] Filed: Apr. 21, 1992

[30] Foreign Application Priority Data

Oct. 19, 1989 [GB] United Kingdom ............... 8923257.3
Oct. 16, 1990 [EP] European Pat. Off. ......... 90311299.3

[51] Int. Cl.⁵ .............................................. B65G 1/04
[52] U.S. Cl. ................................. 414/286; 187/9 R; 414/785; 414/608; 414/668; 414/664; 414/282; 414/749
[58] Field of Search ............... 414/785, 603, 608, 267, 414/662, 663, 664, 668, 659, 660, 266, 277, 281, 282, 286, 749; 187/9 R, 9 E; 364/478

[56] References Cited

U.S. PATENT DOCUMENTS

| | | | |
|---|---|---|---|
| 2,624,470 | 1/1953 | Geist | 414/277 X |
| 2,628,734 | 2/1953 | Jannsen | 414/785 |
| 3,187,917 | 6/1965 | Miller | 414/664 |
| 3,447,697 | 6/1969 | Morey et al. | 414/608 X |
| 3,719,288 | 3/1973 | Schmitt et al. | 414/281 X |
| 3,737,060 | 6/1973 | Shaffer | 414/669 |
| 3,854,616 | 12/1974 | Willis et al. | 414/607 |
| 4,639,181 | 1/1987 | Tsubouchi | 414/785 X |
| 5,215,427 | 6/1993 | Olsthoorn et al. | 414/664 |

FOREIGN PATENT DOCUMENTS

| | | | |
|---|---|---|---|
| 209789 | 6/1960 | Australia | 414/267 |
| 1295478 | 5/1969 | Fed. Rep. of Germany . | |
| 2240633 | 2/1974 | Fed. Rep. of Germany | 414/607 |
| 2411415 | 9/1975 | Fed. Rep. of Germany | 414/281 |
| 2931241 | 2/1981 | Fed. Rep. of Germany . | |
| 1008072 | 10/1965 | United Kingdom | 414/281 |
| 1296443 | 11/1972 | United Kingdom . | |
| 1395613 | 5/1975 | United Kingdom . | |

*Primary Examiner*—Frank E. Werner
*Attorney, Agent, or Firm*—Buchanan Ingersoll

[57] ABSTRACT

A pallet handling platten system of the invention includes an auxiliary platten unit. The auxiliary platten unit comprises a pair of auxiliary plattens 30 normally stowable beneath the level of the load bearing surfaces of primary plattens 5 of the system. Devices 74,72 are provided for lifting the auxiliary plattens 30 to a first elevated level, for moving the auxiliary plattens 30 laterally of the system while not under load, and for lifting them when so extended to a second elevated level to take the load of the pallet. The primary plattens 5 of the system are then withdrawn while the load is supported on the auxiliary plattens, but the auxiliary plattens do not themselves move laterally under load.

5 Claims, 6 Drawing Sheets

PALLET HANDLING PLATTEN UNIT

FIELD OF THE INVENTION

The invention relates to platten units for use in pallet handling and in the storage of palletized loads in a warehouse rack system.

BACKGROUND ART

Palletized loads are conventionally stored on rack systems in warehouses, with each pallet being placed spanning a pair of horizontal support beams which run adjacent to and parallel to an aisle. The pallet handling equipment moves along the aisle and can be raised and lowered to deliver palletized loads to empty positions in the rack and to retrieve palletized loads from filled positions.

The handling equipment may be a platten unit which has one or two horizontally and telescopically extending lifting arms or plattens designed to fit beneath a pallet and lift the pallet and its load. The plattens may be extensible to either side of the platten unit body so that collection of pallets from and delivery of pallets to both sides of the aisle is possible. Such a platten unit is said to be a double reach telescopic unit.

Continental European pallets conventionally comprise top boarding which provides a top surface or goods supporting platform, and three rows of legs or runners on which the top boarding is supported. The plattens of a platten unit for pallet handling contact the bottom surface of the top boarding to lift the loaded pallet.

One problem encountered by pallet handling equipment is that not all pallets conform to the above standard. Most British pallets, as well as those of many other countries such as the USA, generally comprise additional bottom boarding which gives the pallets additional stability and strength. The platten or plattens of a platten unit for pallet handling contact the underside of the bottom boarding, which extends across some or all of the underside of the pallet. Therefore a pallet with top and bottom boarding cannot be set down on a level surface or on a pair of horizontal beams of conventional warehouse racking without providing some means for removing the plattens while the level surface or horizontal beams takes the weight of the loaded pallet. This problem has in the past been met by providing packing pieces for the warehouse racking. Each bay of the racking system is provided with two horizontal beams, and each beam is provided with two packing pieces being load-bearing members which straddle the beam on which they are mounted and present a load-bearing surface for supporting a pallet a spaced distance above the beam. A pallet with top and bottom boarding can then be placed on the array of four packing pieces in the racking bay, and the plattens can be withdrawn through the spaced distance separating the bottom of the pallet and the beams This solution does however carry its own drawbacks since four packing pieces are required per bay: packing pieces are costly to secure in place; and additional storage height is required to accommodate the packing pieces.

The invention provides a pallet handling platten unit for use with pallets with top and bottom boarding, which avoids the above disadvantages.

SUMMARY OF THE INVENTION

The invention provides a pallet handling platten unit for placing top and bottom boarded pallets on racks and retrieving them therefrom, comprising one or more primary plattens for engaging beneath the bottom boarding of a pallet and moving the pallet laterally of the unit to a position over a pair of beams of a warehouse storage rack; at least one auxiliary platten normally stowable beneath the level of the load-bearing surface or surfaces of the primary platten or plattens; means for elevating the auxiliary platten or plattens to first and second elevated levels relative to the primary platten or plattens: means for moving the auxiliary platten or plattens laterally of the unit while at such a first elevated level and not under load, to insert it or them into the fork pockets of a pallet on the laterally extended primary platten or plattens beneath the top boarding of the pallet, means for raising the auxiliary platten or plattens when so extended to the second elevated level to take the load of the pallet from the primary platten or plattens; means for withdrawing the primary platten or plattens while the load is taken by the auxiliary platten or plattens; means for lowering the auxiliary platten or plattens to deposit the pallet onto the beams of the rack; and means for withdrawing the auxiliary platten or plattens from the fork pockets.

It will be appreciated that the above unit can be used equally for depositing loaded pallets on a storage rack or for retrieving loaded pallets from a storage rack.

The invention also provides an auxiliary platten assembly for such a pallet handling unit, comprising one or more auxiliary plattens mountable on the platform of the pallet handling unit in alignment with fork pockets of pallets carried on the platform but beneath the level of the primary platten or plattens of the unit; means for raising the auxiliary platten or plattens to a first elevated level relative to the platform above that of the primary platten or plattens when there is no pallet over the platform area; means for extending the auxiliary platten or plattens to one side or to either side of the platform into fork pockets of a pallet alongside the platform; and means for raising the auxiliary platten or plattens to a second elevated level when so extended to lift the pallet while the primary plattens move laterally to or from a position beneath the pallet.

When the loaded pallet is located centrally of the platten unit for movement along an aisle of a warehouse, it rests on the primary platten or plattens and the auxiliary plattens are stowed beneath the level of the load-bearing surface or surfaces of the primary platten or plattens. Only when the pallet has been moved laterally of the unit for example from an aisle position to a position within a storage bay of a warehouse rack storage system, can the auxiliary plattens be raised to their first level and extended laterally into the fork pockets of the pallet. Because the auxiliary plattens are simply to take the weight of the loaded pallet in the bay while the primary platten or plattens is or are being withdrawn, and do not function to move laterally while under load, they can be designed to move on slides rather than on rollers, and can be moved laterally by means of a hydraulic ram, or by a hydraulic or electric motor, any of which may be associated with a cable or chain and pulley system to give a platten movement in excess of the ram or motor movement. It is sufficient for the auxiliary plattens to extend into the fork pockets for only about two-thirds of the width of the pallet.

If the primary plattens are double reach plattens, then the auxiliary plattens should also be double reach plattens. The vertical movement of the auxiliary plattens relative to the primary platten or plattens is preferably under the control of a hydraulic ram, which may act directly to create a vertical lift of the auxiliary plattens to their first and second elevated levels relative to the first platten or plattens, or which may act on a lever or cam arrangement to provide the necessary vertical lift. The control of the vertical and lateral movements of the auxiliary plattens is preferably interfaced with the control of the primary platten or plattens in a single integrated control unit.

All top and bottom boarded pallets comprise a pair of outside edge runners or rows of outside legs separating the top and bottom boarding. The smallest sized pallets have no intermediate runners or legs. Most pallets have one central intermediate runner or row of legs. Very large or heavy duty pallets may have more than one intermediate runner or row of legs. Clearly the location of the auxiliary plattens is chosen to avoid fouling any intermediate runners or rows of legs. For example, for a pallet system with no central runner a single broad auxiliary platten may be used. For a pallet system with three runners, if the platten unit comprises a pair of primary plattens for engaging beneath the bottom boarding of the pallet near the outside legs or runners, then the auxiliary plattens preferably comprise a pair of plattens for engaging beneath the top boarding of the pallet between the primary plattens near the central legs or runner. If for such a pallet system the platten unit comprises a single primary platten for engaging centrally beneath the bottom boarding of the pallet then the auxiliary plattens preferably comprise a pair of plattens for engaging beneath the top boarding of the pallet one on each side of the primary platten near the outside legs or runners. In the latter case a synchronous control of the auxiliary plattens may be achieved by an electrical or hydraulic link rather than by mechanical interconnection.

DESCRIPTION OF A PREFERRED EMBODIMENT OF THE INVENTION

Figure 1:
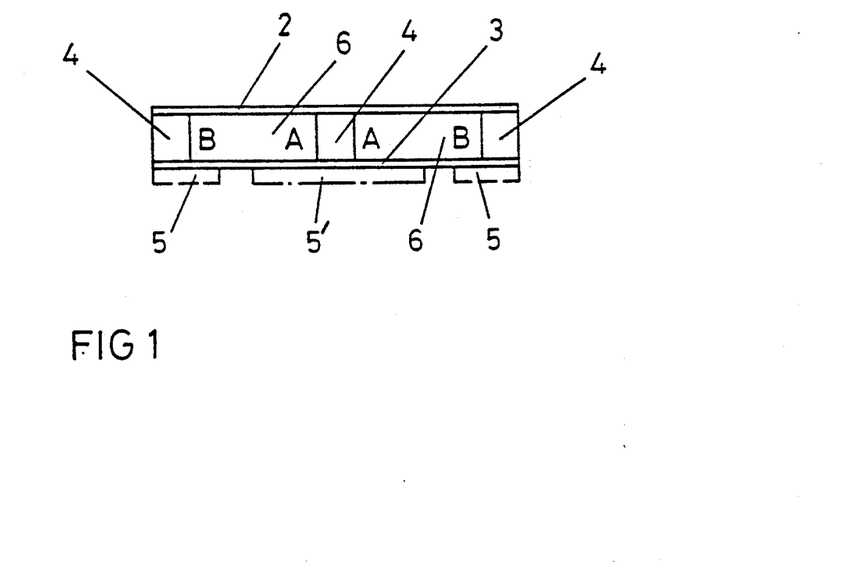
FIG. 1 is a schematic side view of a pallet illustrating the preferred positions of single and double primary plattens in use.

FIG. 1 illustrates a side view of a conventional top and bottom boarded pallet 1, simply for the purpose of identifying the different lifting areas of that pallet. The pallet comprises top boarding 2 and bottom boarding 3 separated by three runners 4 which are structural members extending the full depth of the pallet. If the runners 4 were replaced by nine discrete wooden blocks, then the pallet would be a four-way entry pallet rather than a two-way pallet.

Figure 2:
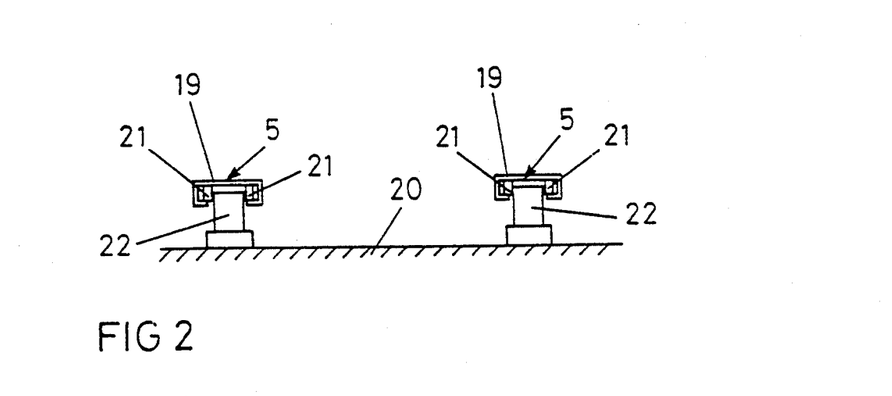
FIG. 2 is a schematic section through a pair of plattens of a conventional double platten unit.

Also shown in FIG. 1 in broken lines are the positions of two plattens 5 of a platten unit such as that shown in FIG. 2 which in use support the pallet on its bottom boarded surface in the vicinity of the outermost two runners 4. Alternatively, the platten unit may have a single central platten 5' which is shown in chain-dotted line, for supporting the pallet generally under the central runner 4.

Also identified in FIG. 1 are the particular locations within the fork pockets 6 of the pallet for entry of the auxiliary plattens of a platten unit of the invention. In the case of a platten unit with two primary plattens 5, the auxiliary plattens preferably enter the fork pockets 6 near the central runner 4 in the general position marked AA. In the case of a platten unit with a single primary platten 5', the auxiliary plattens preferably enter the fork pockets near the outside runners 4, in the zones generally marked BB.

FIG. 2 shows very schematically the two plattens 5 of a conventional platten unit. The plattens are mounted on a load platform 20 which can be traversed along an aisle and vertically between different bays of a warehousing rack system in conventional manner. Each platten comprises a laterally movable load-bearing rail 19 telescopically extendable to either side of the load platform 20 by being mounted on rollers 21 on an intermediate rail 22 which is itself movable laterally of the platform. The lateral movement is conventionally controlled by gearing (not shown) which is effective to extend the two plattens 5 simultaneously to one side only of the unit (single reach) or to either side of the unit (double reach).

Figure 3:
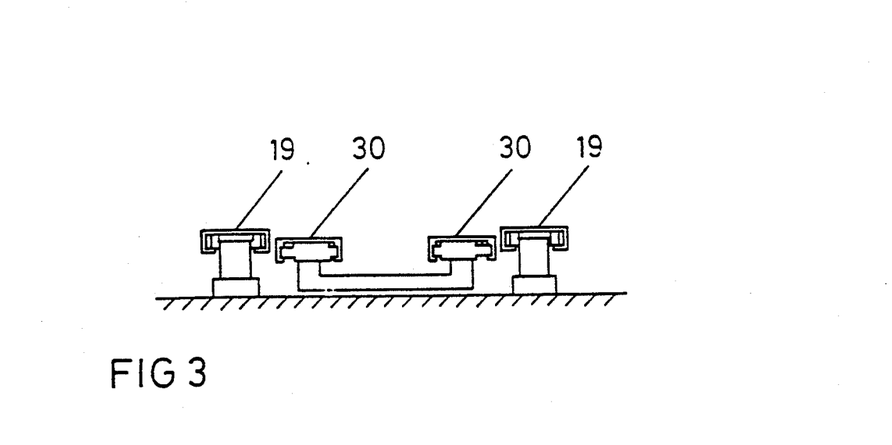
FIG. 3 is a section similar to that of FIG. 2 but through a platten unit of the invention illustrating the location of a pair of auxiliary plattens.
Figure 4:
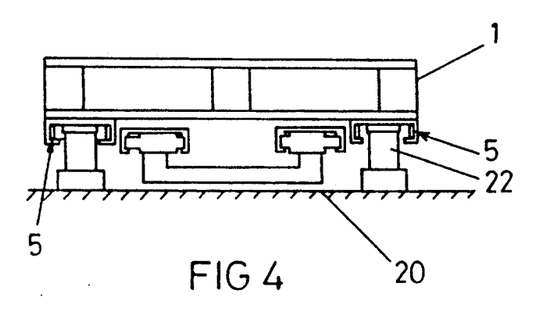
FIG. 4 is a section similar to that of FIG. 3, but showing a pallet on the pair of primary plattens.
Figures 4A, 4B:
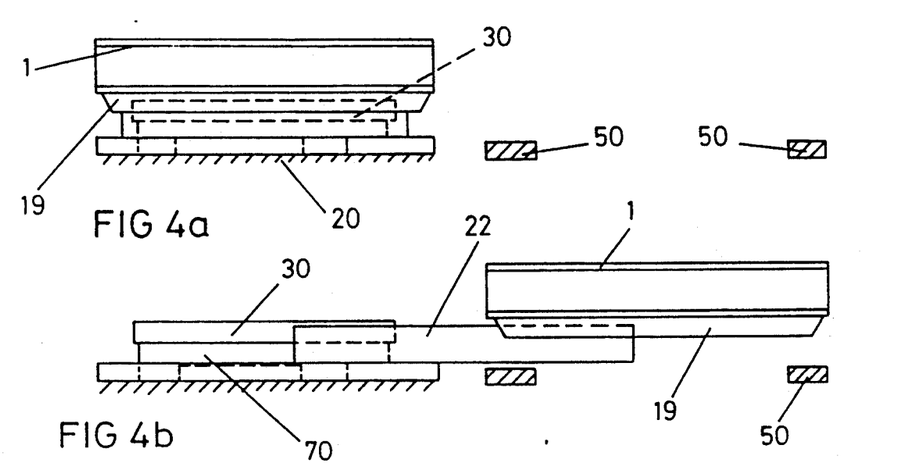
FIG. 4a is a side elevation of the platten unit and pallet of FIG. 4, adjacent a storage rack for the pallet.
FIG. 4b is a side elevation similar to that of FIG. 4a, but with the primary plattens of the platten unit laterally extended to position the pallet over the storage rack.
Figure 5:
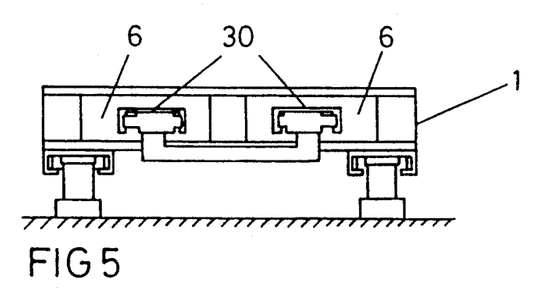
FIG. 5 is a section similar to that of FIG. 4, but showing the auxiliary plattens raised to their first elevated levels and aligned with the fork pockets of the pallet, for lateral extension into those fork pockets.
Figure 6:
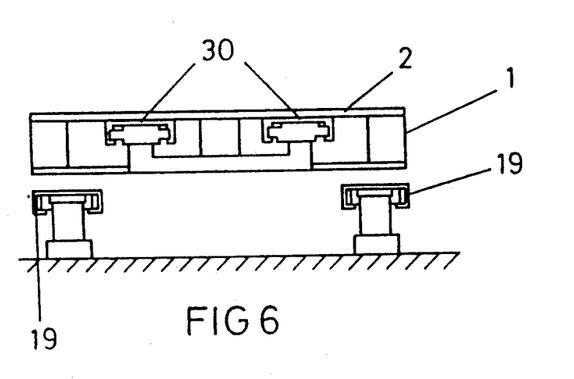
FIG. 6 is a section similar to that of FIG. 5, but showing the auxiliary plattens raised to their second elevated levels to take the load of the pallet from the primary plattens and to permit lateral withdrawal of the primary plattens.

FIG. 3 shows schematically how in a platten unit of the invention the above conventional plattens 5, which will be referred to as the primary plattens, are supplemented by a pair of auxiliary plattens 30. The auxiliary plattens 30 are movable vertically with respect to the primary plattens 5, as well as being mounted for extension laterally in single reach or double reach fashion in the same way as the primary plattens 5. The vertical and horizontal movements may be achieved in any convenient manner, but preferably are actuated by two independent hydraulic rams (not shown). The movement of the auxiliary plattens 30 is illustrated in FIGS. 4 to 6. In FIG. 4 a pallet 1 is shown resting on the primary plattens 5 of the unit, with the auxiliary plattens 30 being retracted to below the level of the load-bearing surfaces of the primary plattens 5. In this position the pallet 1 can be carried by the platten unit along the aisles of a warehouse, and can be raised or lowered to any intended delivery height. When at the intended location as illustrated in FIG. 4a, the plattens 5 can be extended laterally to the side of the unit as illustrated in FIG. 4b, with the pallet 1 clearing the auxiliary plattens 30. FIGS. 4a and 4b illustrate pallet supporting beams 50 of conventional warehouse racking for the pallets, and FIG. 4b illustrates how the pallet 1 is extended laterally over the beams 50 without the pallet 1, or the primary plattens 5 or intermediate rails 22 fouling the beams.

Figures 5A, 5B:
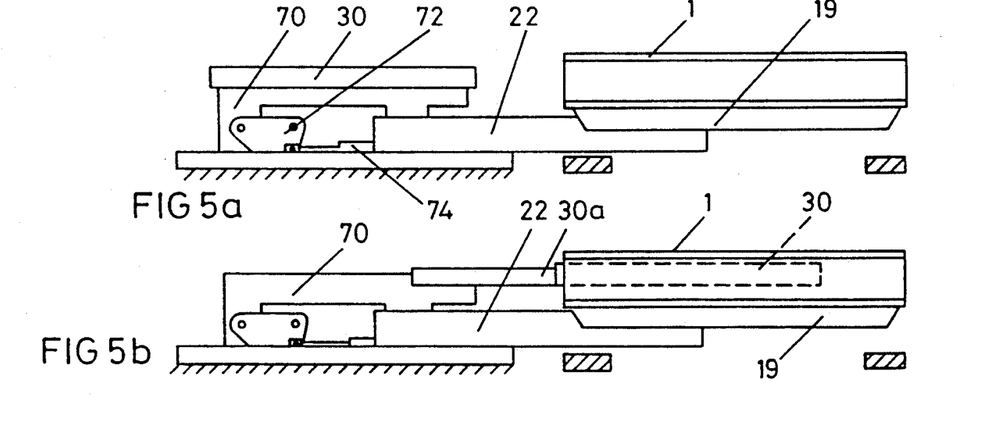
FIG. 5a is a side elevation of the platten unit and pallet of FIG. 5, before lateral extension of the auxiliary plattens into the fork pockets of the pallet.
FIG. 5b is a side elevation similar to that of FIG. 5a, but after lateral extension of the auxiliary plattens into the fork pockets of the pallet.

When the loaded pallet 1 has been moved completely to one side of the platten unit on laterally extended primary plattens 5, the auxiliary plattens 30 can be raised to a first working height, relative to the primary plattens 5, as shown in FIGS. 5 and 5a. At this height the auxiliary plattens 30 can be extended laterally into the fork pockets 6 of the pallet 1 as illustrated in FIG. 5b. The auxiliary plattens 30, like the primary plattens 5, are mounted on laterally movable intermediate rails 30a. FIGS. 5a and 5b also show, schemematically and only in part, the raising mechanism 70,72,74 for raising and lowering the auxiliary plattens. That raising mechanism is described and illustrated in greater detail below with reference to FIG. 7, but is sufficient to define three different heights for the auxiliary plattens, namely their retracted height of FIGS. 4, 4a and 4b; their first working height of FIGS. 5, 5a and 5b and a second working height which is higher than the first.

Figure 6A:
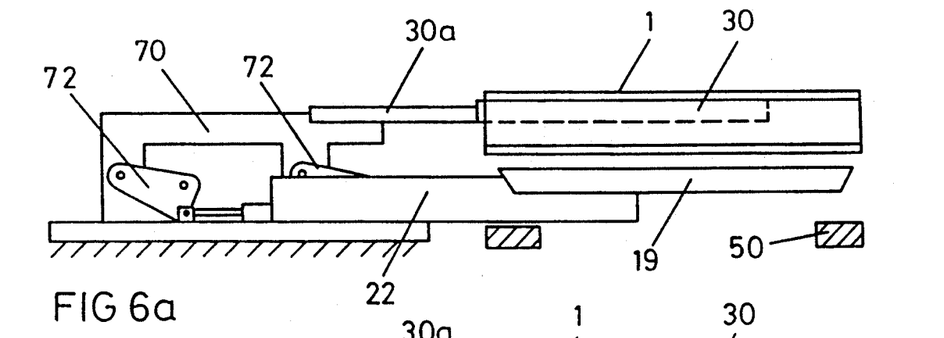
FIG. 6a is a side elevation of the platten unit and pallet of FIG. 6, with the auxiliary plattens in the fork pockets of the pallet and raised to their second elevated levels but with the primary plattens still laterally extended.
Figure 6B:
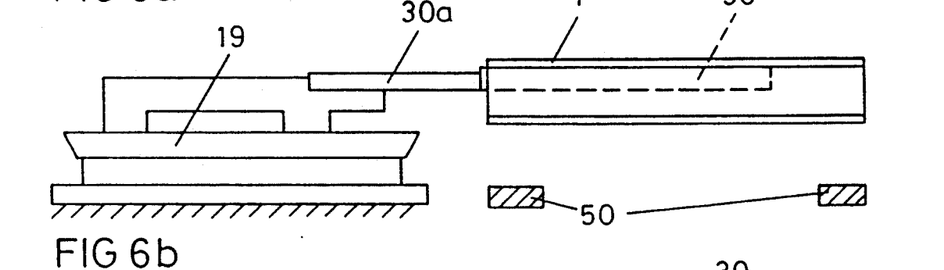
FIG. 6b is a side elevation similar to that of FIG. 6a but with the primary plattens retracted.
Figure 6C:
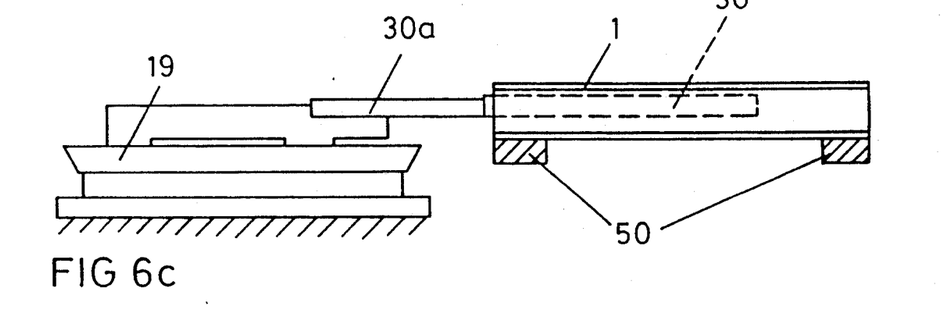
FIG. 6c is a side elevation similar to that of FIG. 6b but after lowering the pallet on the auxiliary plattens until it rests on the storage rack.

The auxiliary plattens 30 are then raised to their second working height as shown in FIG. 6, being the height at which they engage the under surface of the top boarding 2 of the pallet 1 and take the load of the pallet, lifting it marginally from the primary plattens 5 as shown in FIGS. 6 and 6a. The primary plattens 5 can then be withdrawn, as shown in FIG. 6b and the loaded pallet 1 lowered on the auxiliary plattens 30 until it rests on the beams 50 of the rack storage bay as shown in FIG. 6c. This lowering can be achieved by lowering the auxiliary plattens 30 relative to the load platform to just below their first working height or by lowering the entire load platform 20 with the auxiliary plattens extended. The auxiliary plattens 30 can then be retracted and lowered once again to the position shown in FIG. 3.

Figure 7:
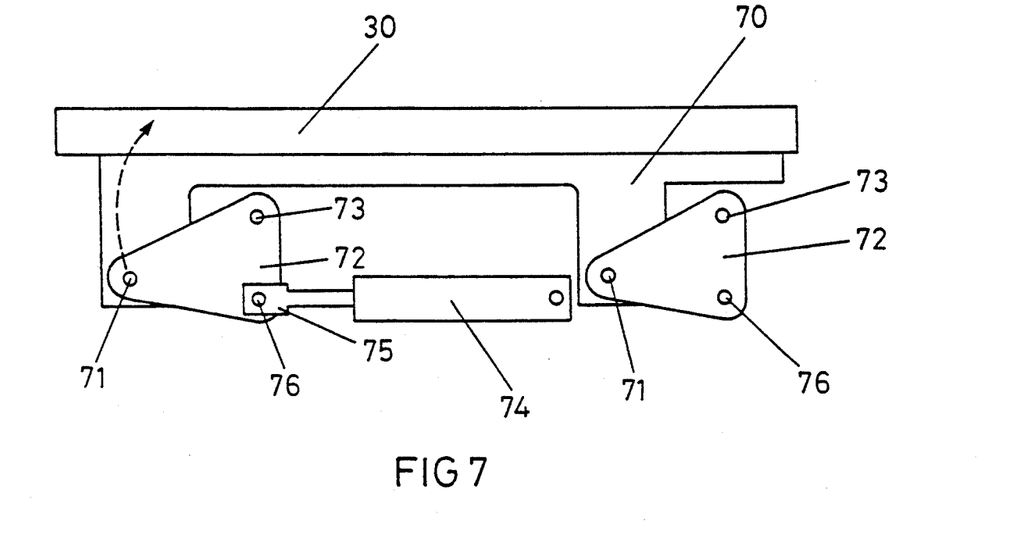
FIG. 7 is a schematic side elevation of an auxiliary platten unit only of the platten unit of FIG. 3.

FIG. 7 illustrates schematically one possible mechanism for controlling the raising and lowering of the auxiliary plattens 30. The auxiliary plattens 30 are slidably mounted on a frame 70 which is supported on four pivot pins 71 of four lever mounting plates 72 mounted one at each corner of the frame 70. Each lever mounting plate 72 is pivotally mounted relative to the body of the platten unit at a top corner 73, so that clockwise rotation of the lever mounting plates 72 as indicated by the dotted line in FIG. 7 raises the frame 70 in an arc. The movement of the lever mounting plates 72 is controlled by a hydraulic ram 74 mounted between, at its right hand side as illustrated, a bulwark (not shown) of the body of the platten unit and, at its left hand side as illustrated, a rod 75 connecting a pair of the lever mounting plates 72. The force of the hydraulic ram 74 is transferred to the other pair of the lever mounting plates 72 by means of tie rods (not shown) pivotally connected between pivot pins 76 at corresponding corners of the various lever mounting plates 72.

As the ram 74 is extended, so the four lever mounting plates 72 rotate clockwise in unison, moving the auxiliary plattens 30 through their first elevated height to their second elevated height.

We claim:

1. A pallet handling platten unit for placing a pallet having a boarded top wall and a boarded bottom wall on a warehouse storage rack and for retrieving the pallet therefrom, the warehouse storage rack including a pair of parallel-spaced beams, the pallet handling platten unit being positioned adjacent and movable parallel to the warehouse storage rack pair of beams, comprising:
   (a) a platform;
   (b) at least one primary platten mounted on the platform;
   (c) means for moving the at least one primary platten into engagement with the boarded bottom wall of the pallet and moving the pallet positioned on the at least one primary platten laterally with respect to the pair of beams such that the pallet and the at least one primary platten are positioned over the pair of beams;
   (d) at least one auxiliary platten mounted on the platform and able to be positioned at an initial level, a first level and a second level where the initial level is beneath the at least one primary platten, the first level is above the at least one primary platten, the second level is above the first level;
   (e) means for elevating the at least one auxiliary platten to the first level;
   (f) means for moving the at least one auxiliary platten laterally of the pair of beams when the at least one auxiliary platten is at the first level such that the at least one auxiliary platten engages the pallet beneath the boarded top wall when the pallet is positioned on the at least one primary platten;
   (g) means for elevating the at least one auxiliary platten from the first level to the second level such that the pallet positioned on the at least one primary platten will be transferred from the at least one primary platten to the at least one auxiliary platten;
   (h) means for withdrawing the at least one primary platten from being positioned over the pair of beams;
   (i) means for lowering the at least one auxiliary platten from the second level to below the first level in order to deposit the pallet onto the pair of beams; and
   (j) means for withdrawing the at least one auxiliary platten from engagement with the pallet positioned on the pair of beams.

2. A pallet handling platten unit according to claim 1, wherein the means for elevating the at least one auxiliary platten to the first level and the means for elevating the auxiliary platten to the second level comprise a hydraulic ram.

3. A pallet handling platten unit according to claim 2, wherein the hydraulic ram acts on a lever to elevate the at least one auxiliary platten to the first level and the second level.

4. A pallet handling platten unit according to claim 1, wherein both the at least one primary platten and the at least one auxiliary platten are double reach plattens.

5. An auxiliary platten assembly for a platten handling unit which places a pallet having a boarded top wall and a boarded bottom wall on a warehouse storage rack and retrieves the pallet therefrom, the warehouse storage rack having a pair of parallel-spaced beams, the pallet handling platten unit being movable adjacent and parallel to the warehouse storage rack pair of beams, the platten handling unit having a platform and at least one primary platten mounted thereon, comprising:

(a) at least one auxiliary platten for mounting on the platten handling unit platform, and able when so mounted to be positioned at an initial level, a first level and a second level where the initial level is beneath the at least one primary platten, the first level is above the at least one primary platten and the second level is above the first level;

(b) means for elevating the at least one auxiliary platten from the initial level to the first level;

(c) means for moving the at least one auxiliary platten positioned at the first level laterally with respect to the pair of beams and into engagement with the pallet positioned on the at least one primary platten over the pair of beams;

(d) means for elevating the auxiliary platten to the second level such that the pallet positioned on the at least one primary platten will be transferred from the at least one primary platten to the at least one auxiliary platten;

(e) means for lowering the at least one auxiliary platten from the second level to below the first level in order to deposit the pallet onto the pair of beams; and (f) means for withdrawing the at least one auxiliary platten from engagement with the pallet positioned on the pair of beams.

* * * * *